United States Patent [19]

Rickey, Jr. et al.

[11] 4,108,718

[45] Aug. 22, 1978

[54] VAPOR FILTRATION PROCESS AND SYSTEM

[75] Inventors: Frank A. Rickey, Jr.; Paul C. Simms, both of Lafayette, Ind.; Neal R. Butler, Acton, Mass.

[73] Assignee: Purdue Research Foundation, West Lafayette, Ind.

[21] Appl. No.: 652,831

[22] Filed: Jan. 27, 1976

[51] Int. Cl.[2] .............................................. B01D 1/00
[52] U.S. Cl. .............................. 159/30; 159/DIG. 16; 159/24 R; 202/205; 202/197
[58] Field of Search ...... 159/DIG. 27, 4 C, DIG. 12, 159/3 D, DIG. 16, 24 R; 55/159, 270, 466; 73/61 R; 202/197, 205, 236; 203/40

[56] References Cited

U.S. PATENT DOCUMENTS

| Re. 27,982 | 4/1974 | Rodgers | 159/DIG. 27 |
|---|---|---|---|
| 2,386,826 | 10/1945 | Wallach et al. | 202/197 |
| 2,788,316 | 4/1957 | Bjorksten | 159/DIG. 27 |
| 2,925,664 | 2/1960 | Cobb et al. | 55/466 X |
| 3,075,891 | 1/1963 | Elam | 159/DIG. 27 |
| 3,129,145 | 4/1964 | Hassler | 202/236 |
| 3,129,146 | 4/1964 | Hassler | 203/10 |
| 3,205,588 | 9/1965 | Oetjen et al. | 159/DIG. 12 |
| 3,340,186 | 9/1967 | Weyl | 203/10 |
| 3,661,721 | 5/1972 | Rodgers | 159/DIG. 27 |

FOREIGN PATENT DOCUMENTS

596,912  4/1960  Canada .......................... 159/DIG. 27

Primary Examiner—Norman Yudkoff
Attorney, Agent, or Firm—John R. Nesbitt

[57] ABSTRACT

A process and system for recovering the materials from an aqueous solution is disclosed. Dissolved materials in the aqueous solution are solidified as the aqueous solution is caused to be changed from liquid to vapor state, and the solidified materials along with suspended materials, if any, are collected. The aqueous solution is caused to be changed from liquid to vapor state at a filter which passes the vapor but blocks passage of liquid, and the filter has a vacuum at the side opposite to that of the aqueous solution so that the vapor is withdrawn through the filter and the solid materials collected on the filter. The system includes a thin film filter that is releasably clamped against a container so that one side of the filter contacts aqueous solution such as water in the container with a vacuum pumping device exerting vacuum pressure on the other side of the filter of less than about 4 mm of Hg. The system is particularly useful for determining impurities in water.

2 Claims, 1 Drawing Figure

VAPOR FILTRATION PROCESS AND SYSTEM

FIELD OF THE INVENTION

This invention relates to a process and system for recovering materials from aqueous solutions and, more particularly, relates to a vapor filtration process and system.

BACKGROUND OF THE INVENTION

It is oftentimes necessary to recover materials from aqueous solutions such as water. With respect materials in solid form that are suspended in the aqueous solution, such materials can be collected by a common filtration process by passing the liquid through a filter having suitable small apertures therein. But such a process cannot recover materials in the aqueous solution that are dissolved in the solution. While failure to recover dissolved materials might not be critical in some instances, it is important, and often vital, in other instances.

It is often important, for example, to determine the elements present in water since water is a basic part of our environment. In this regard, trace impurities in water are an important factor in the growth of people, animals and plants, and accurate measurements of impurities in water can avoid health hazards which are already known and can be utilized to determine unknown correlations between trace elements and healthy growth.

By way of further example, water flows over and through much of the earth. During this flow, minerals are dissolved in the water. Information for locating such minerals (including valuable minerals) can be obtained by recovering and analyzing these trace impurities.

In both of the foregoing examples, impurities as small as one part per billion parts of water can be significant. It is therefore obvious what accurate measurement cannot be achieved if there is appreciable loss in recovery of the materials or if introduction of extraneous matter is not minimized.

Thus, a recovery system that recovers as many elements as possible will provide the best and most accurate information. In addition, such a system should, if possible, be simple yet dependable and be economical to operate.

While dissolved materials cannot be recovered by the common filtration system described hereinabove, it is, of course, possible to precipitate some of the dissolved materials by adding appropriate chemicals. This process, however, has been found to be disadvantageous in recovering all original materials in the liquid without loss or addition of unknown trace impurities.

SUMMARY OF THE INVENTION

This invention provides a process and system that is capable of recovering dissolved materials in an aqueous solution as well as solid state materials suspended in such a solution. The process and system utilizes vapor filtration to recover dissolved materials in the aqueous solution with minimum probability of losing dissolved materials or introducing extraneous materials not originally present in the solution. In addition, the system is simple to construct yet is dependable and is economical to operate.

It is therefore an object of this invention to provide an improved process and system for recovering materials in an aqueous solution.

It is still another object of this invention to provide an improved system that is simple to construct, yet is dependable and economical of operation.

It is still another object of this invention to provide an improved process and system for recovering dissolved materials from an aqueous solution.

It is yet another object of this invention to provide a vapor filtration process and system.

It is a further object of this invention to provide an improved process for recovering materials including dissolved materials in an aqueous solution and analyzing the same to determine the materials present in the aqueous solution.

It is yet another object of this invention to provide a process for recovering dissolved materials that includes a filter having one side in contact with an aqueous solution and the other side having a vacuum thereat so that water vapor penetrates the filter and is carried away from the filter when the liquid is caused to change to a vapor phase with dissolved materials being solidified and retained by the filter.

It is still another object of this invention to provide a system having a container to receive aqueous solution with the aqueous solution in contact with one side of a thin film filter that is releasably clamped to the container and has the other of the filter subjected to vacuum by a vacuum pumping system.

It is yet another object of this invention to provide a process and system for determining impurities in water by recovering materials from the water including dissolved materials.

It is still another object of this invention to provide a process and system to determine trace impurities in water with minimum loss and introduction of extraneous materials.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawing illustrates a complete embodiment of the invention according to the best mode so far devised for the practical application of the principle thereof, and in which the single FIGURE is a cutaway side view of the system of this invention.

DESCRIPTION OF THE INVENTION

Figure 1:
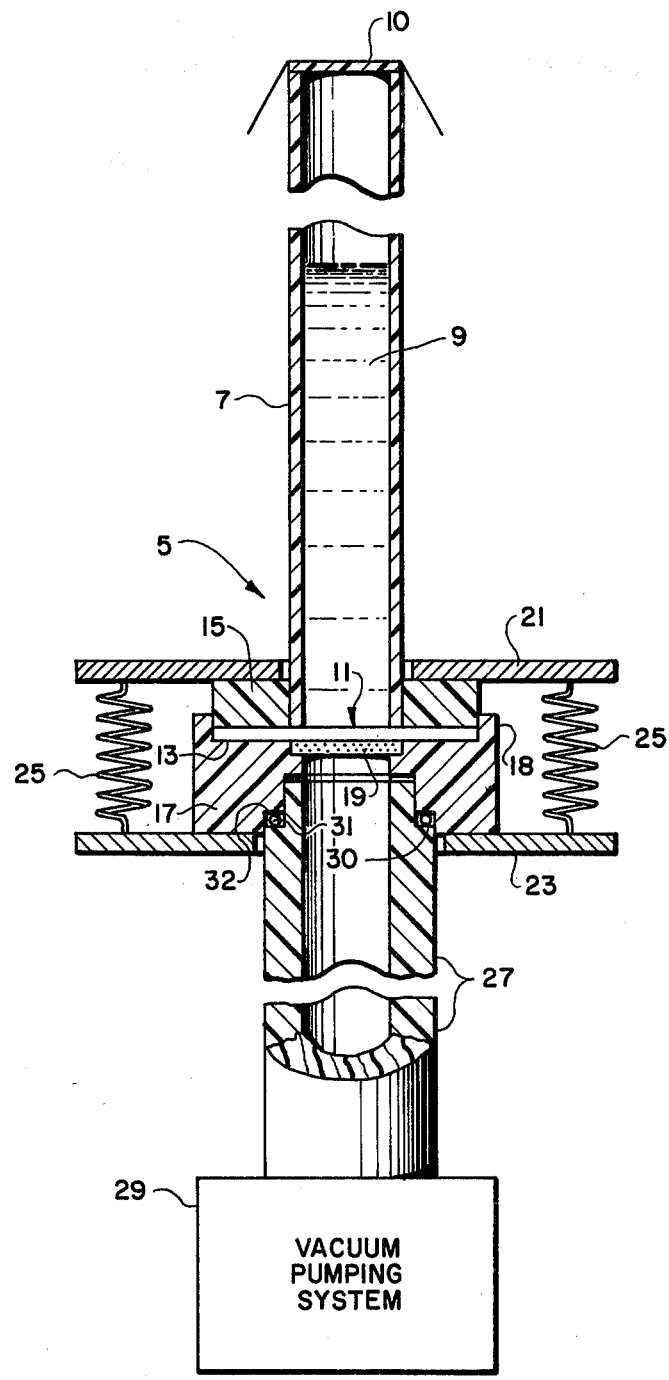

The system 5, as shown by the single FIGURE of the drawing, and the process of this invention, while having some similarity to a conventional filter, operates on a different principle so that both dissolved and suspended materials may be recovered from an aqueous solution, such as water.

As shown in the drawing, system 5 includes a tube, or container, 7 for receiving and retaining an aqueous solution, such as water, 9 within the tube. After the water has been placed in the tube, a cover 10 is preferably placed on the container to prevent airborne impurities from entering the tube.

The bottom of tube 7 is closed by a thin-film vapor-filter 11 that completely covers the bottom of the tube. The periphery 13 of the filter extends beyond the side walls of the tube and is releasably clamped between a collar 15 and base 17. Annular collar 15 surrounds tube 7 at the bottom thereof and may be conventionally fastened thereto. Collar 15 in addition to aligning the tube and base also prevents the vapor filter from picking up airborne impurities.

Base 17 is cylindrical and has a bore in the central portion thereof with a diameter substantially equivalent to that ot tube 7. A lip 18 of base 17 extends upwardly outside of collar 15 so that filter 11 is essentially enclosed at the outer edge, and a porous support disc 19 is conventionally secured to base 17 to span the central bore therein, and disc 19 engages the lower side of filter 11, that is, the side opposite to that in contact with the aqueous solution 9 in tube 7. Disc 19 is very porous to enable operation of the system as described hereinafter.

The collar and base (and hence the tube and filter) are releasably clamped together by a clamping arrangement consisting of annular arms 21 and 23 having springs 25 extending therebetween to bias the arms toward engagement.

The lower portion of base 17 has an upwardly extending tube 27 wherein with tube 27 leading to a conventional vacuum pumping system 29. Tube 27 has a shoulder 30 thereon and a vacuum seal is provided thereat by o-ring 31, the o-ring being positioned between shoulder 30 of tube 27 and a shoulder 32 in base 17. Disc 19 is very porous to allow vacuum system 29 to create a very low pressure on the bottom side of the vapor filter.

While the various components making up the system of this invention are shown herein to be tubular, annular and/or cylindrical, it is to be realized of course that the invention is not meant to be restricted to such components and other dimensions could be utilized as would be obvious to one skilled in the art. In addition, it is to be realized that a different system for holding the various components in the necessary predetermined manner could also be utilized as would be obvious to one skilled in the art.

In a working embodiment of this invention, polycarbonate plastic was utilized for the tube, collar and base since this material is easy to clean, resists nitric acid, does not add or remove materials from the sample, and has good mechanical properties. The porous support disc was made of fritted polyethylene with the base and tube-collar being washed in a 10% solution of nitric acid and rinsed in ultra pure water after each sample of water was processed. Suitable materials could obviously likewise be utilized.

The vapor filter 11 blocks the passage of liquid such as water in the liquid state, but readily passes vapor such as water vapor. The liquid in contact with the filter is caused to change to a vapor state, and this causes dissolved materials in the liquid to be solidified with the result that as the vapor passes through the filter having a vacuum at the opposite side, most dissolved materials and suspended matter are left as solids on the filter. The water vapor is pulled away from the filter by the vacuum pumping system, and it has been found that so long as the pressure on the vacuum side of the filter is held below about 4 mm of Hg, water at room temperature will not pass through the filter as a liquid.

It has also been found that when there is a relatively large amount of dissolved solids in water ($\gtrsim$ 50 mg/liter), a significant part of the material is deposited on the surface of the filter. Fortunately, however, this surface material adheres to the similar material deposited within the filter, so the samples can easily be handled without mechanical damage and loss of recovered solids.

After collecting the solidified materials at the filter, the samples obtained can then be analyzed without additional preparation such as by Proton Induced X-ray Emission (PIXE) or X-ray Fluorescence (XRF).

For the working embodiment of this invention, a variety of thin-films filters were tested and it was determined that a thin filter ($<10^{-3}$ inch), uncoated cellophane can be effectively used as a vapor filter. With such a filter utilized, approximately 0.7 milliliters of water per hour will pass through a 0.5 inch diameter circle of $0.7 \times 10^{-3}$ inch cellophane (the vapor filter) when the pressure on the vacuum side of the cellophane is $<$ 4 mm Hg.

The sample obtained is protected because there is minimum handling and only brief exposure to outside sources of contamination. After the base, tube and cover are cleaned, it takes only a few seconds to assemble the device. The aqueous solution, such as water, is then poured, or conducted, through the container (tube) and the cover is immediately put over the container. The vacuum is applied through tube 27 to the filter and the portion of the water engaging the filter is caused to be changed to a vapor state with the dissolved materials in the liquid being solidified as the water changes to vapor state. The vapor passes through the filter and the solid materials (including that solidified from dissolved material and material suspended in the water) are collected and retained in and on the filter.

No further handling is required until the thin filter is removed (by removing the clamps) and the recovered material on the filter analyzed.

Extensive testing of the working embodiment was conducted for many elements commonly found in water, including: K, Ca, Sc, Ti, V, Cr, Mn, Fe, Ni, Cu, Zn, Ga, Ge, Rb, Sr, Y, Zr, Nb, Mo, Pd, Ag, Cd, In, Sn, Sb, Te, I, Cs, Ba, La, W, Pt, Pb, and Bi. Typically better than 95% recovery of these elements was obtained.

In view of the foregoing, it can be seen that this invention provides a novel process and system for recovering materials from aqueous solutions by vapor filtration.

What is claimed is:

1. A vapor filtration system, comprising:
   a container for receiving water having dissolved materials therein;
   a thin film having one side in contact with said water in said container, said thin film passing water vapor but blocking passage of water and solids therein;
   supporting means for maintaining the relative positioning between said thin film and said container, said supporting means including spring biased clamping means and a porous support engaging said thin film at the other side of said thin film; and
   vacuum supply means providing a pressure differential at the other side of said thin film with water in contact with said thin film being caused to be changed to water vapor and dissolved materials in said water solidified when said water vapor is formed, said solid materials being collected on said thin film as said water vapor passes through said thin film.

2. The system of claim 1 wherein said container is a tube and wherein said thin film and porous support are discs with the perimeter of said thin film being clamped into position by said clamping means.

\* \* \* \* \*